US010450899B2

(12) United States Patent
Ferraris (10) Patent No.: US 10,450,899 B2
(45) Date of Patent: Oct. 22, 2019

(54) GAS TURBINE EXHAUST DIVERTER SYSTEM DUCT GUIDE RAILS

(71) Applicant: GE Energy Products France SNC, Belfort (FR)

(72) Inventor: Alan Ferraris, Belfort (FR)

(73) Assignee: GE Energy Products France SNC, Belfort (FR)

(*) Notice: Subject to any disclaimer, the term of this patent is extended or adjusted under 35 U.S.C. 154(b) by 840 days.

(21) Appl. No.: 15/018,879

(22) Filed: Feb. 9, 2016

(65) Prior Publication Data

US 2016/0356219 A1    Dec. 8, 2016

(30) Foreign Application Priority Data

Jun. 8, 2015  (FR) ...................................... 15 55179

(51) Int. Cl.
| | | |
|---|---|---|
| *F01D 25/30* | (2006.01) | |
| *F28F 9/02* | (2006.01) | |
| *F16K 11/065* | (2006.01) | |
| *F16K 3/02* | (2006.01) | |
| *F22B 1/18* | (2006.01) | |

(52) U.S. Cl.
CPC .............. *F01D 25/30* (2013.01); *F28F 9/028* (2013.01); *F16K 3/029* (2013.01); *F16K 11/0655* (2013.01); *F22B 1/1815* (2013.01); *Y02E 20/16* (2013.01)

(58) Field of Classification Search
CPC ........ F01D 25/30; F28F 9/028; F16K 11/065; F16K 11/0655; F16K 3/02; F16K 3/029; F22B 1/1815; F22B 37/24
See application file for complete search history.

(56) References Cited

U.S. PATENT DOCUMENTS

| | | | | |
|---|---|---|---|---|
| 3,184,223 A | * | 5/1965 | Webber ............... | F16K 11/0655 137/309 |
| 3,527,440 A | * | 9/1970 | Presslauer ............ | F16K 27/044 251/158 |
| 3,805,884 A | * | 4/1974 | Burt ...................... | F16K 11/052 110/163 |
| 3,897,773 A | * | 8/1975 | Burt ...................... | F16K 11/052 110/163 |
| 4,239,711 A | * | 12/1980 | Dick ..................... | B01D 53/18 110/216 |
| 4,582,296 A | * | 4/1986 | Bachmann ............ | F16K 3/316 138/94.3 |
| 4,645,083 A | * | 2/1987 | Vinciguerra ........... | B66C 17/00 212/315 |

(Continued)

FOREIGN PATENT DOCUMENTS

KR    2011-0104792 A    9/2011

*Primary Examiner* — Lorne E Meade
(74) *Attorney, Agent, or Firm* — Eversheds Sutherland (US) LLP (57) ABSTRACT

This gas turbine exhaust system provides a bypass duct having a gas inlet section capable of receiving the turbine exhaust gas, a first section for connection with an exhaust gas collector and a second section for connection with a heat collection boiler, detachable ducts respectively opened and closed, selectively fitted in the first and second sections, to operate the exhaust system in a simple cycle mode or in a combined cycle mode, and guide rails for guiding the ducts.

6 Claims, 11 Drawing Sheets

(56) References Cited

U.S. PATENT DOCUMENTS

| | | | | |
|---|---|---|---|---|
| 4,783,048 A * | 11/1988 | St. Clair | F16K 3/0281 | 251/129.11 |
| 4,821,507 A * | 4/1989 | Bachmann | F16K 11/052 | 137/875 |
| 4,919,169 A * | 4/1990 | Bachmann | F16K 11/052 | 137/875 |
| 5,299,601 A * | 4/1994 | Koch | F16K 31/521 | 137/875 |
| 5,488,971 A * | 2/1996 | Squirrell | F16K 1/2028 | 137/375 |
| 5,697,596 A * | 12/1997 | Kremers | F16K 11/052 | 137/875 |
| 6,443,425 B1 * | 9/2002 | von Erichsen | F16K 11/052 | 137/875 |
| 6,748,734 B1 * | 6/2004 | Coleman | F01D 25/30 | 122/7 B |
| 7,191,598 B2 * | 3/2007 | Coleman | F01D 25/30 | 60/772 |
| 7,555,890 B2 * | 7/2009 | Kurihara et al. | F01D 25/30 | 122/7 B |
| 8,091,858 B2 * | 1/2012 | Janich et al. | F02C 9/16 | 60/39.182 |
| 8,127,795 B2 * | 1/2012 | Janich | F16K 11/052 | 137/875 |
| 8,251,786 B2 * | 3/2012 | Buttell | F01D 11/005 | 137/246.22 |
| 9,291,342 B2 * | 3/2016 | Kramer et al. | A62C 2/18 | 454/254 |
| 2005/0005609 A1 | 1/2005 | Coleman et al. | | |
| 2005/0268594 A1 | 12/2005 | Kurihara et al. | | |

* cited by examiner

GAS TURBINE EXHAUST DIVERTER SYSTEM DUCT GUIDE RAILS

TECHNICAL FIELD

The present application and the resultant patent relate generally to gas turbine engines and more specifically relate to gas turbines operating in a simple cycle method, where the exhaust gases of the turbine may be collected by a gas exhaust collector and released to the atmosphere through a chimney, and in a combined cycle method, where the output gases may be led by an exhaust system to a heat collection boiler to produce steam which in turn may be provided to a steam turbine. Specifically, the present application relates to a gas turbine exhaust system with a bypass duct that directs the exhaust gas either into the atmosphere, in a simple cycle, or towards the collection boiler, in a combined cycle. The exhaust system may be reconfigured according to the operating phases or maintenance requirements of the turbine.

BACKGROUND OF THE INVENTION

When operating a turbine and when the heat collection boiler needs to be put out of order for maintenance, it may be necessary to ensure the closure of the bypass section towards the boiler. Similarly, when the gas turbine is reconfigured from a simple cycle to a combined cycle by installing a heat collection boiler, the bypass section towards the exhaust collector must be closed. These sections of the exhaust system may be closed with closure devices such as shutters, doors, guillotine, open or closed ducts, and the like.

The closure devices of these exhaust systems may be subjected to very high constraints due to the temperature differentials that may exist on either side of these devices. Such temperature differentials may create very high mechanical constraints on the closure devices and may create sealing problems during operation. The kinematics of the closure devices must be reliable so as to allow proper operation and good sealing of the mechanisms even after long periods of inactivity.

There are various types of exhaust systems capable of being configured according to an operating mode in a simple cycle or in a combined cycle. In this regard, U.S. Pat. No. 5,299,601 describes a flow bypass system including a panel that may be rotated through a drive mechanism with several articulated branches. Document KR 2011 0104792 describes a similar exhaust system including a flow bypass system with panels connected to a rotary shaft. U.S. Patent Publication No. 2005/268594 describes an electric power plant operating in a combined cycle having a gas turbine associated with a heat collection boiler to collect the exhaust gas of the turbine at high temperature. U.S. Patent Publication No. 2005/005609 describes an exhaust system for a gas turbine that is capable of shifting from a combined cycle to a simple cycle. The exhaust system is fitted with an assembly of ducts that may be maneuvered under the action of a mobile conveyor on a rail.

Nevertheless, it was observed that the various flow bypass solutions provide either an expensive but rapid conversion mechanism or a less expensive conversion mechanism having a longer conversion time. In fact, the most recent mechanisms that are used to maneuver the closure devices of the bypass sections of the exhaust systems may be relatively complex to implement and may require considerable human resources, for example, for the shifting of the various elements.

SUMMARY OF THE INVENTION

Thus, a purpose of the invention is to allow a change in the operating method of a simple cycle or a combined cycle thermal plant by simplifying the mechanism and the tools to implement this change as well as by reducing the human resources required. In other words, the invention proposes to simplify the maneuvering of the closure devices of the bypass sections of the exhaust system without risk to the maintenance operators or the components of the exhaust system.

Thus, an exhaust system is proposed for a gas turbine that may include a bypass duct for the turbine exhaust gas having a gas inlet section capable of receiving the exhaust gas from the turbine, a first section connected to the exhaust collector and a second section connected to the heat collection boiler, and detachable ducts respectively being opened and closed and selectively being fitted in the first and second sections so as to operate the exhaust system in a simple cycle mode or in a combined cycle mode. The bypass duct may include an assembly of at least one guide rail capable of guiding the ducts about the bypass duct. The exhaust system thus allows the handling and setting up of the detachable ducts on the bypass duct.

According to another characteristic of the exhaust system, a set of rails may be provided on the first section. Each rail may have a first rectilinear part for translational guidance of one of the detachable ducts in a substantially transverse direction as compared to the first outlet section and a second part acting as a ramp for guiding the detachable duct against the first outlet section of the bypass duct.

According to another characteristic, the exhaust system may include a pair of rails on each side of the first outlet section extending in parallel and placed one above the other. These rails are not necessarily aligned. Each rail may include the rectilinear part and the ramp part so as to receive a roller borne by each detachable duct. Favorably, the rectilinear part of the rails may be inclined diagonally so as to allow the duct to converge naturally, under the effect of its weight, towards the final position on the first section. The bypass duct may be fitted with a cable winch in order to facilitate the shifting of a detachable duct along the rails. Furthermore, each detachable duct may be fitted with a body for attaching a lifting device or a winch. The exhaust system and the collection boiler may include a set of sealing joints and/or additional ducts positioned between one of the detachable ducts and the first section or the second section of the bypass duct.

The exhaust system may be configured in the combined cycle mode by fitting a closed detachable duct on the outlet of the first section, towards the atmosphere, by maneuvering the duct on the rail up to the fitting position, and an open duct on the outlet of the second section, towards the collection boiler. Also, the exhaust system may be configured in the simple cycle mode by fitting an open detachable duct on the outlet of the first section, towards the atmosphere, by maneuvering the duct on the rail up to the fitting position, and a closed duct on the outlet of the second section, towards the collection boiler. Furthermore, before the step of maneuvering a duct, it may be necessary to disconnect the components located downstream of the bypass system. The space required to allow the setting up of these detachable ducts thus may be available, for example, by compression of a sealing joint.

These and other features and improvements of the present application and the resultant patent will become apparent to one of ordinary skill in the art upon review of the following

DETAILED DESCRIPTION

Referring now to the drawings, in which like numerals refer to like elements throughout the several views, FIGS. 1-4 illustrate an example of an exhaust system for a gas turbine as may be described herein, referred to by the general numeric reference 1. This exhaust system is meant to be positioned at the outlet of a gas turbine of a power plant to collect exhaust gases and guide the exhaust gases to an exhaust collector 2, in this instance, a chimney, when the gas turbine operates in a simple cycle or towards a heat collection boiler, whereof only an inlet 3 is shown. As is seen, the exhaust system may include a bypass duct 4 that internally provides a gas passage towards the chimney 2 and a gas passage towards the boiler 3. The bypass duct 4 thus has an inlet section E for the exhaust gas of the turbine that receives an incidental flow of gas according to arrow F, a first outlet section 6 for connection with the chimney 2, and a second outlet section 7 for connection with the boiler.

When the exhaust system operates in a simple cycle mode, the first outlet section 6 is opened thanks to a first duct 8 and the second outlet section 7 is closed with a second duct 9. On the other hand, when the exhaust system 1 operates in a combined cycle mode, the first outlet section 6 is closed with the first duct 8 and the second section 7 is opened by the second duct 9. The ducts 8, 9 may be detachable.

The bypass duct, within the framework of this description, includes portions of a duct or a pipe internally providing a gas passage. This passage may be closed, in case of a closed duct, or open, in case of an open duct. The shifting from the simple cycle or the combined cycle may be done according to the requirements of the power plant by maneuvering the ducts in the passages within the bypass duct.

Thus, the exhaust system may be fitted with a closed or an open duct, i.e., a duct that has an open square, rectangular, or circular section sized sufficiently to allow the passing of the exhaust gases to the chimney 2 or to the boiler 3. To allow the maneuvering of a duct, we see in FIG. 2 that the bypass duct 4 may be fitted with a number of guide rails, such as 10, on which the ducts may maneuver as compared to the bypass duct 4. In the execution mode illustrated in FIG. 2, the exhaust system may have a set of the guide rails 10 provided on each side of the first outlet section 6. All of the rails may have an overall slope in order to ensure shifting by gravity of the detachable ducts 8 and 9 while they are set up on the bypass duct 4.

Figure 2:
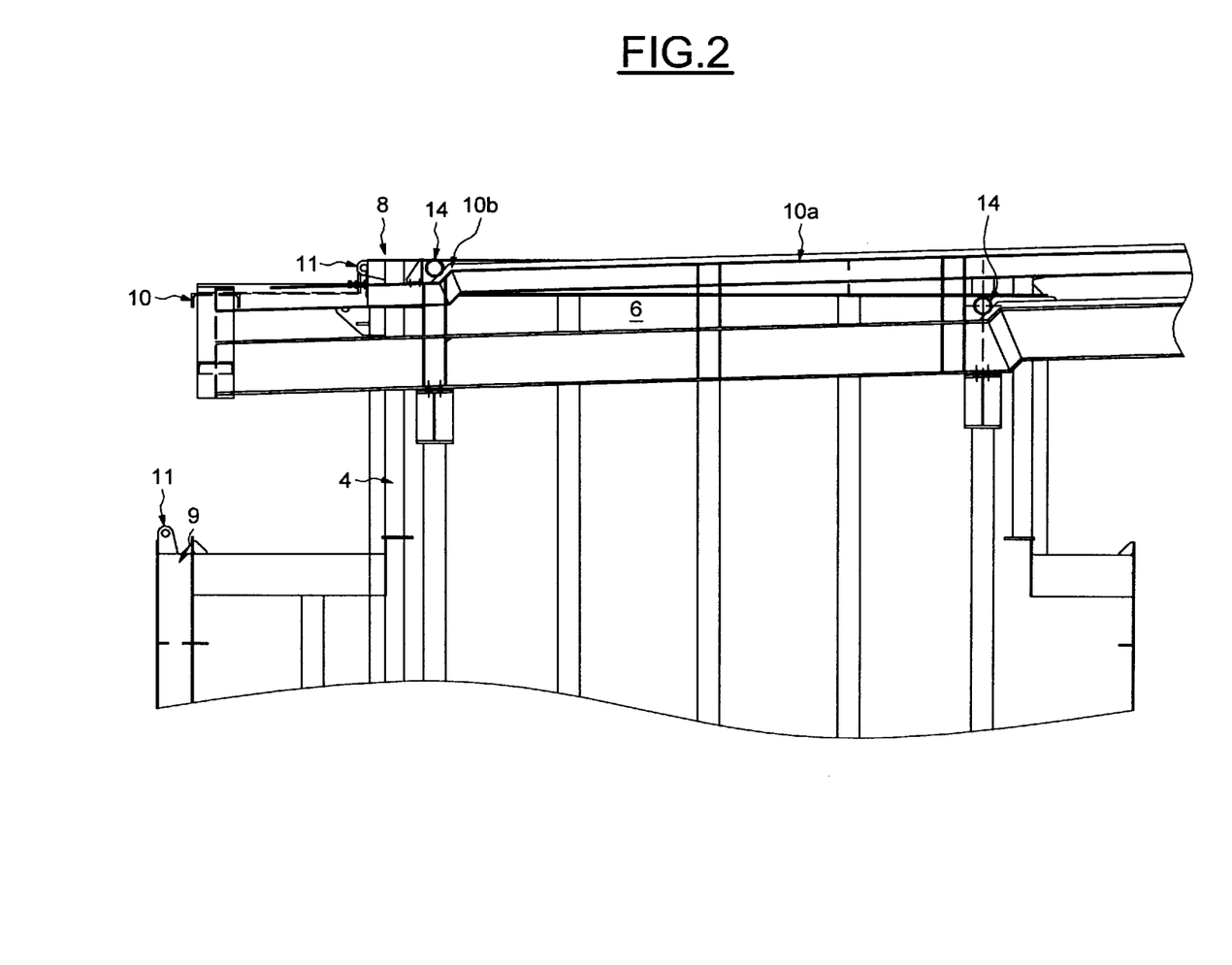
FIG. 2 is seen illustrating the main phases of an exhaust system control process of FIG. 1.
Figure 3:
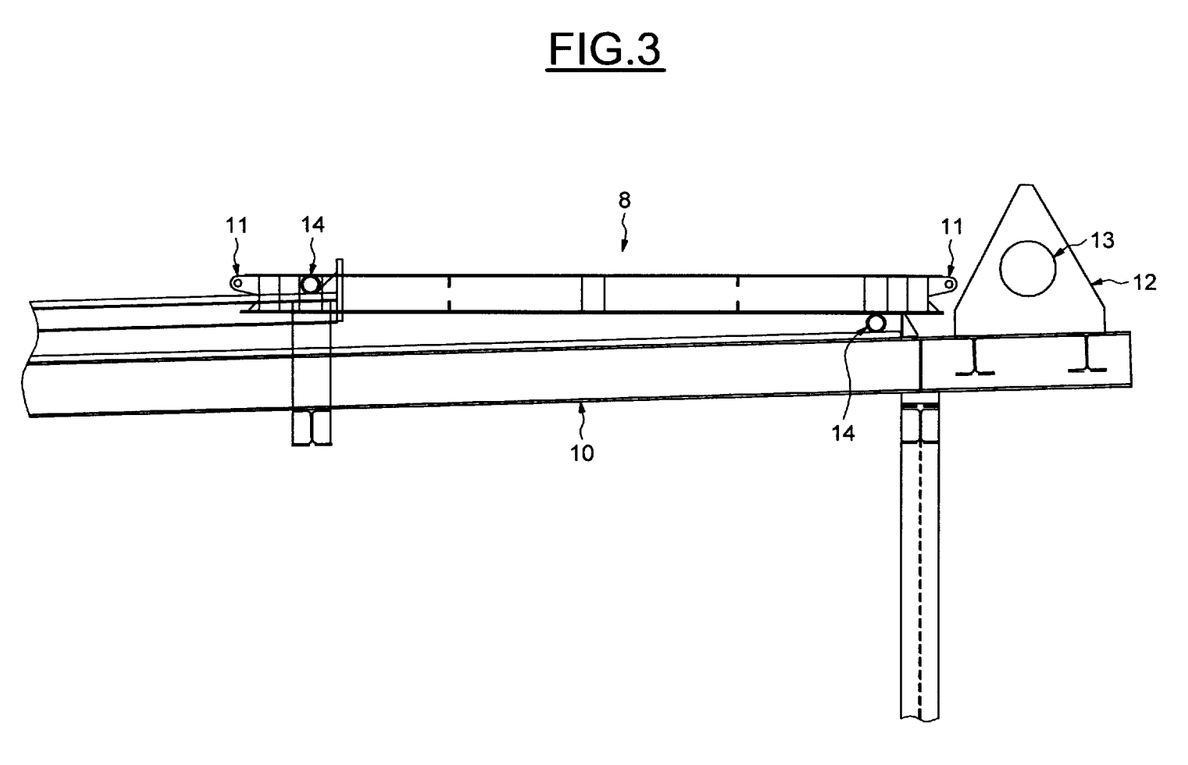
FIG. 3 is seen illustrating the main phases of an exhaust system control process of FIG. 1.

With reference to FIGS. 2 and 3, the ducts 8 and 9 each may be provided with lateral lifting lugs, such as 11. The bypass duct 4 of the exhaust system may be fitted with a winch 12 whose pulley block 13 is located in the plane of the lifting lugs 11 of a duct, when it is placed on the first section. Furthermore, each duct 8 or 9 may be fitted with lateral rollers 14 meant to maneuver on the guide rails 10. For example, each duct may have, on each side, and thus for each guide rail, two rollers placed in the front and the rear, after consideration of the direction of movement of the ducts at the time of fitting. These rollers may be integrated or related to the ducts.

The winch may be aimed at controlling the descending speed (due to the slope) while setting up the ducts 8 and 9 on the exhaust duct. On the other hand, the winch may allow withdrawing the ducts 8 or 9. However, other means may be used to ensure this function, for example, a wheeled motor, a wheel with brakes for the descent, or any other equivalent means.

Figure 1:
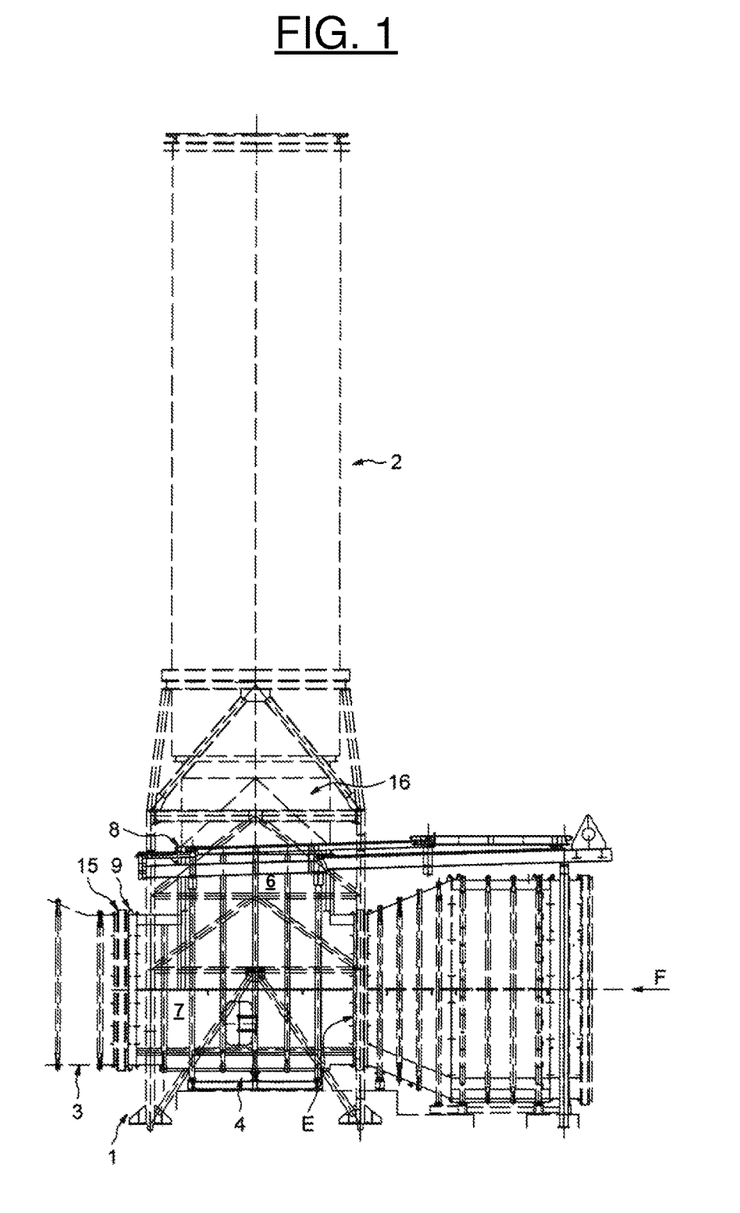
FIG. 1 is a profile view of an exhaust system for gas turbine as is described herein.

In FIG. 2, it is seen that the rails 10 may include a linear transverse portion 10a ensuring the transverse guiding of the rollers and an inclined section at the end 10b that constitutes a ramp for guiding the rollers towards a seat provided at one end of the first section. In other words, the second part 10b of the rail may be configured such that while being guided on this second part, a duct may be maneuvered towards the bottom in a manner so as to come to rest against the first section of the bypass duct and, while removing the duct, this second part 10b may provide sufficient lateral displacement with respect to the bypass duct. As represented in FIG. 1, an expansion or sealing joint, such that 15, and/or several ducts, such as 16, must be displaced or compressed in order to ensure the movement of the ducts.

FIGS. 4-8 describe the main steps to implement a change in the configuration of the exhaust system so as to operate in a simple cycle mode or in a combined cycle mode. For example, the exhaust system may be reconfigured from an operating mode in a combined cycle to an operating mode in a simple cycle.

Figure 4:
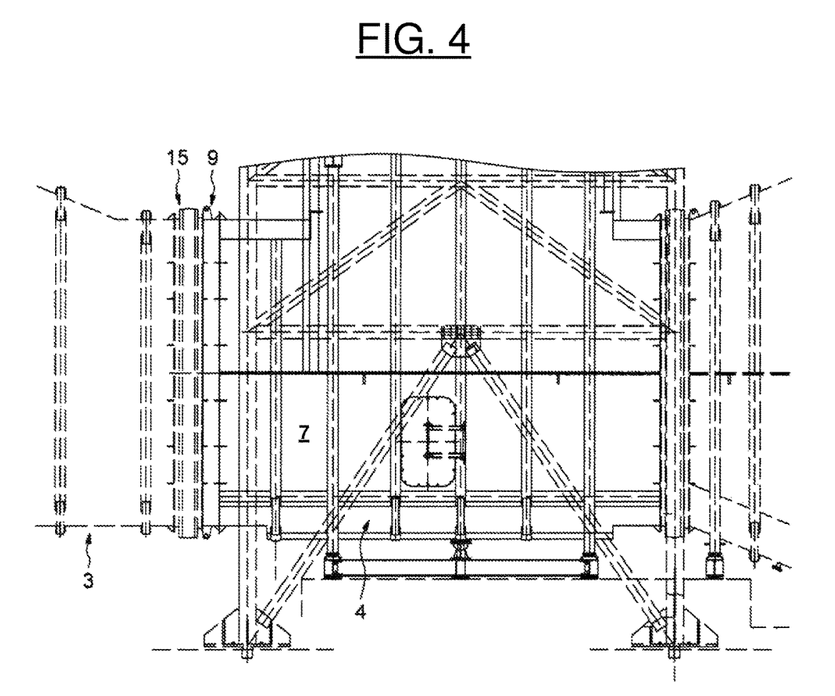
FIG. 4 is seen illustrating the main phases of an exhaust system control process of FIG. 1.
Figure 5:
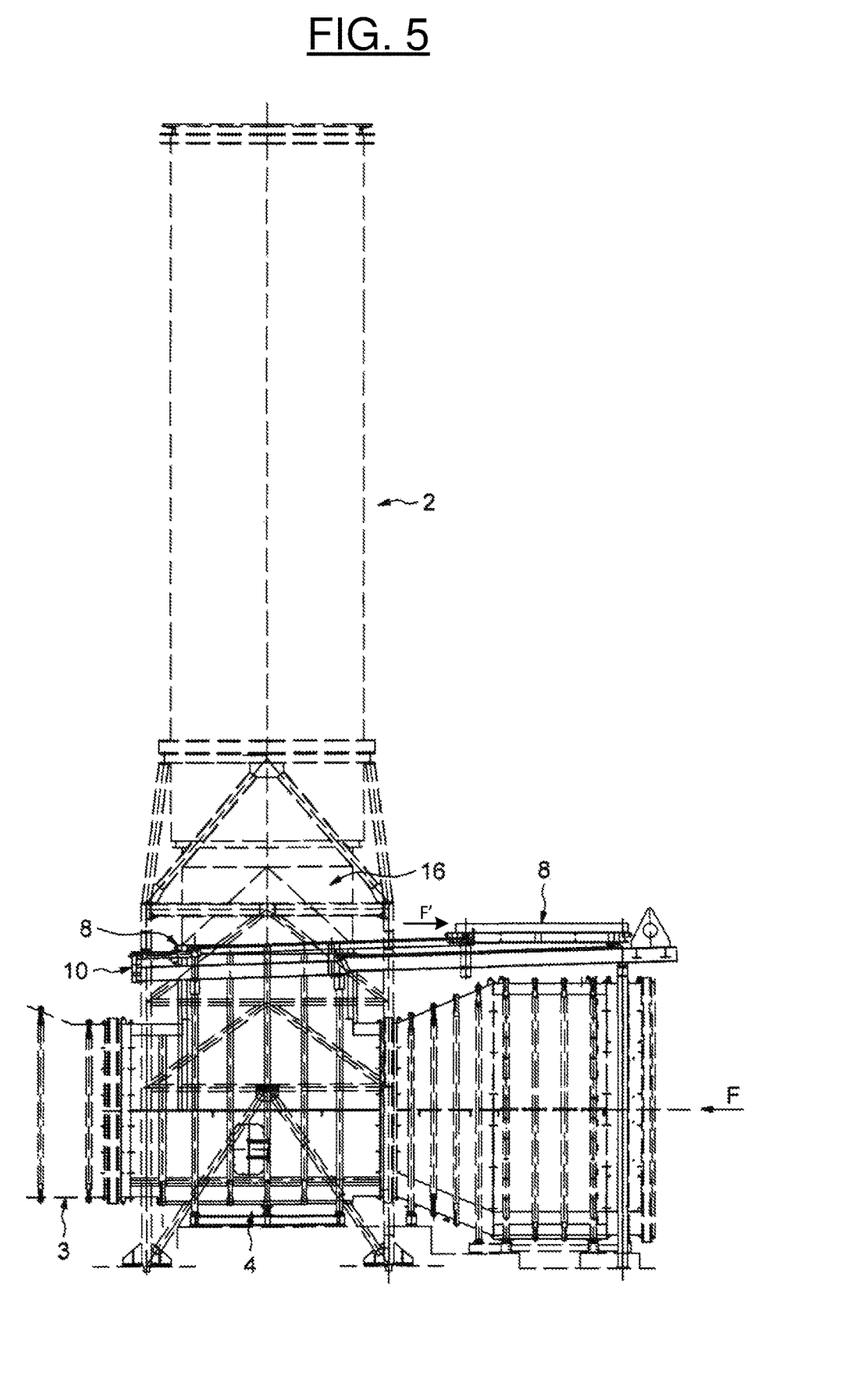
FIG. 5 is seen illustrating the main phases of an exhaust system control process of FIG. 1.
Figure 6:
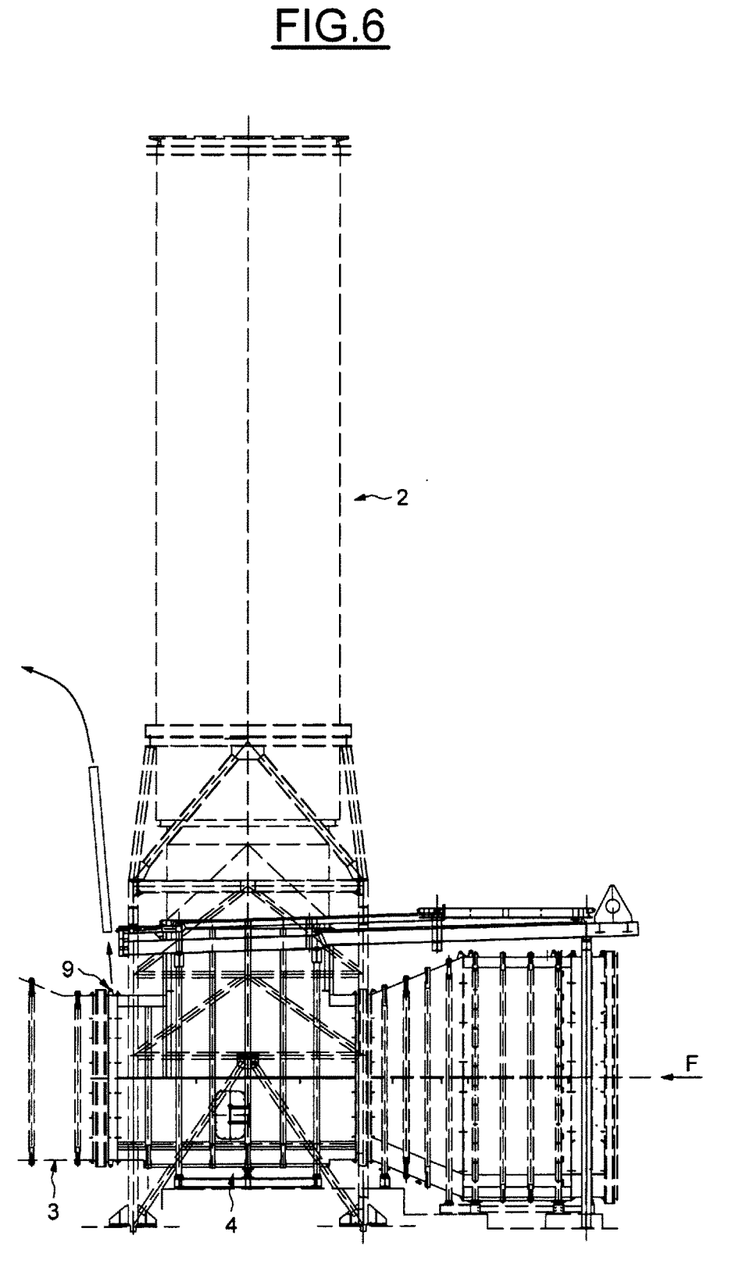
FIG. 6 is seen illustrating the main phases of an exhaust system control process of FIG. 1.

With reference to FIG. 4, one of the parts of the expansion joint 15 positioned on the side of the boiler, in this case, the right part, may be mechanically disconnected and this portion of the joint may be compressed. In the next step (FIG. 5), the first closed duct positioned on the first outlet section of the bypass duct may be mechanically disconnected and the duct 8 may be raised with lifting means (such as winches, slings, and the like). The duct 8 then may be slid on the rails (arrow F'). At the start of the course, the rollers 14 may circulate along the ramp 10b of the rail 10 such that duct 8 may be raised in order to then be shifted translationally.

Figure 7:
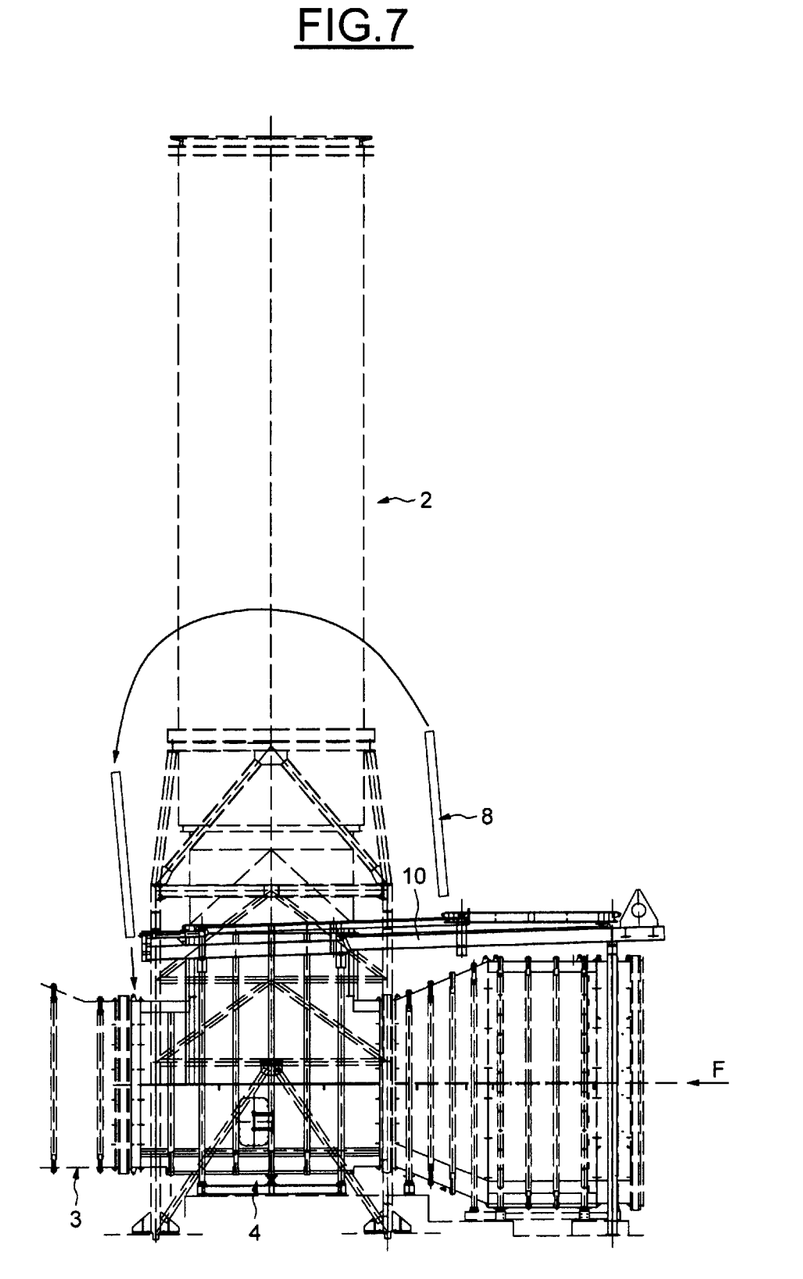
FIG. 7 is seen illustrating the main phases of an exhaust system control process of FIG. 1.
Figure 8:
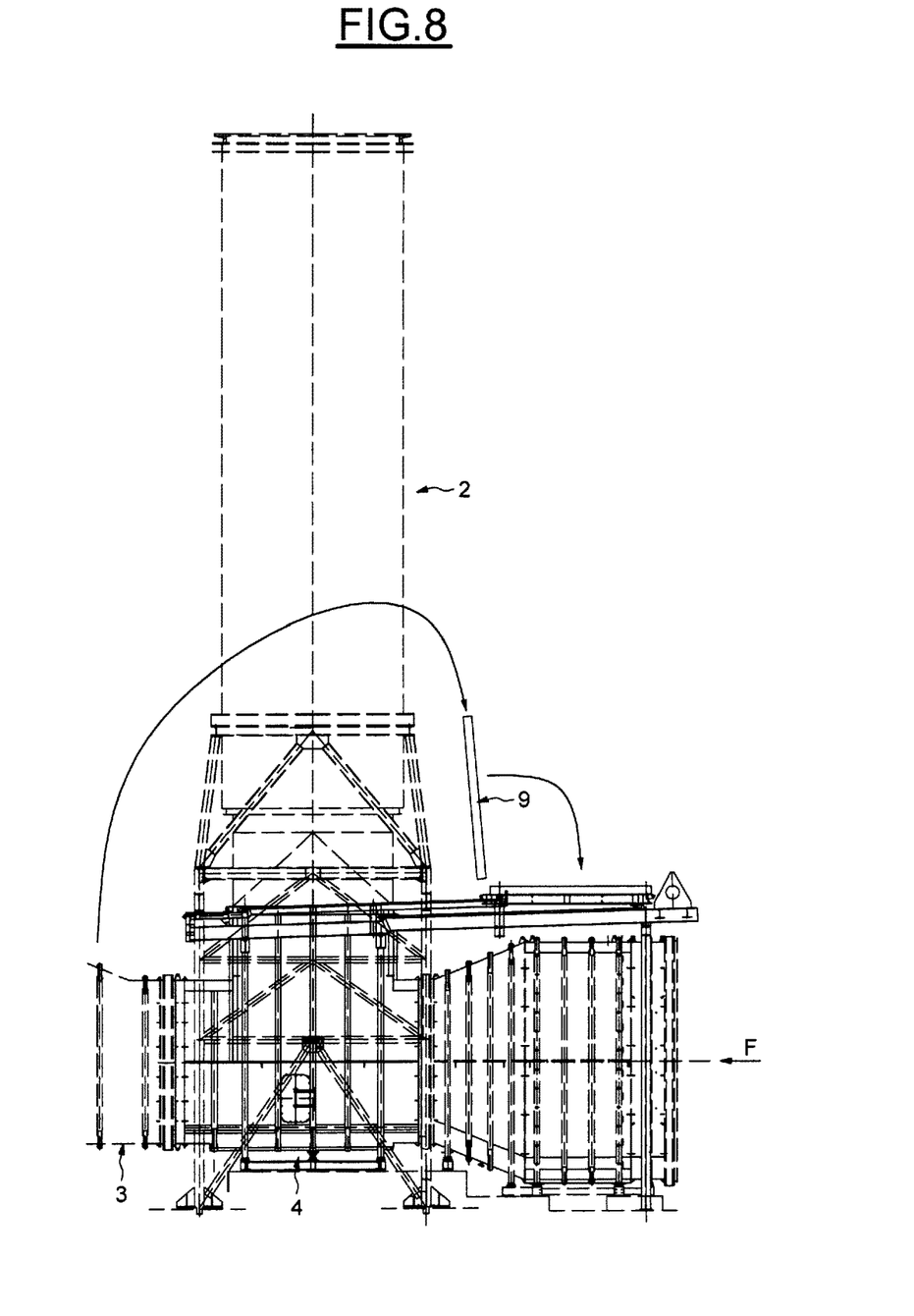
FIG. 8 is seen illustrating the main phases of an exhaust system control process of FIG. 1.

In the next step (FIG. 6), the open duct 9 located on the side of the boiler may be mechanically disconnected and raised with a lifting device. This duct may be stored nearby. The first duct that is set up on the side of the boiler then may be straightened (FIG. 7). The second duct 9 then may be vertically positioned and then laid on the rail with a lifting means (FIG. 8) with the winch and the rail slope. This duct then may be maneuvered by natural transfer, by gravity with speed controlled by the winch, along the first part 10a of the rail until it reaches the second part 10b to come to rest on the first section of the bypass duct. The ducts then may be mechanically assembled such that the joints and ducts may be refixed.

As illustrated in FIGS. 9-12, in which the first section 6 connected to the chimney has been schematically represented, and in which a duct is shown with its two rollers 14a and 14b, the exhaust system may include, on each side of the first section, two guide rails A and B that extend in parallel and in a substantially inclined manner to form a slope descending towards the first section. Each guide rail A and B may have the linear transverse portion 10a and the end ramp 10b. One of the rollers, i.e., the referenced roller 14a, is meant to circulate on a first rail A whereas the other roller 14b is meant to circulate on the other rail B. A similar arrangement may be provided on the other side (not represented) of the first section 6.

Figure 9:
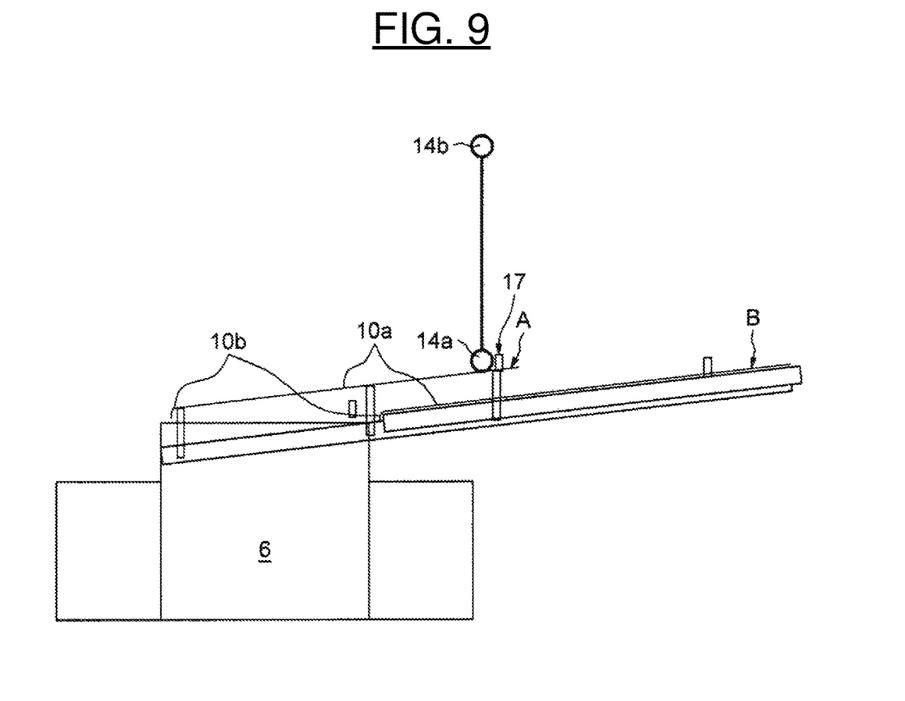
FIG. 9 illustrates the main phases of a control process of a special execution mode of an exhaust system as may be described herein.
Figure 10:
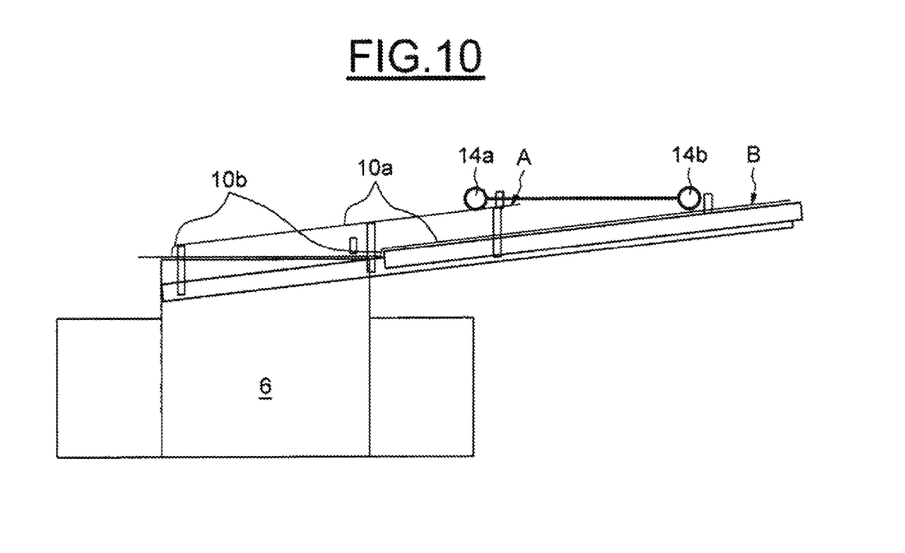
FIG. 10 illustrates the main phases of a control process of a special execution mode of an exhaust system as may be described herein.
Figure 11:
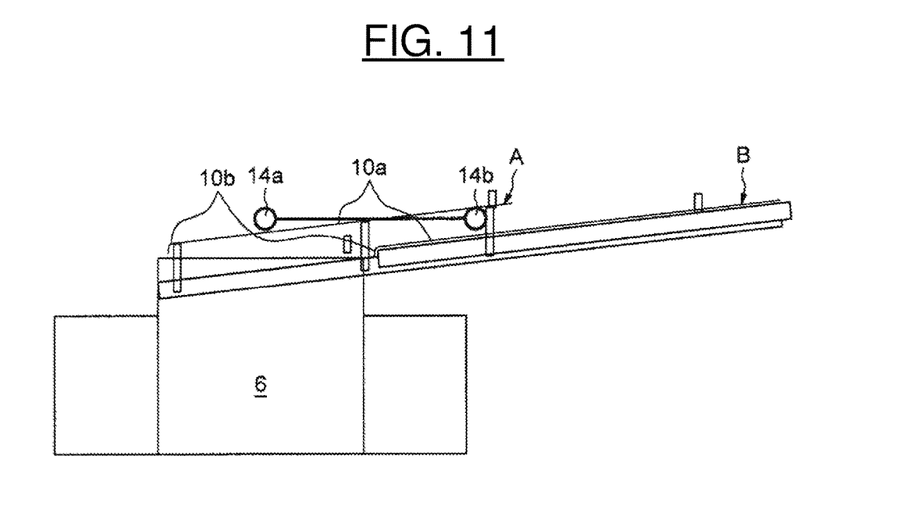
FIG. 11 illustrates the main phases of a control process of a special execution mode of an exhaust system as may be described herein.
Figure 12:
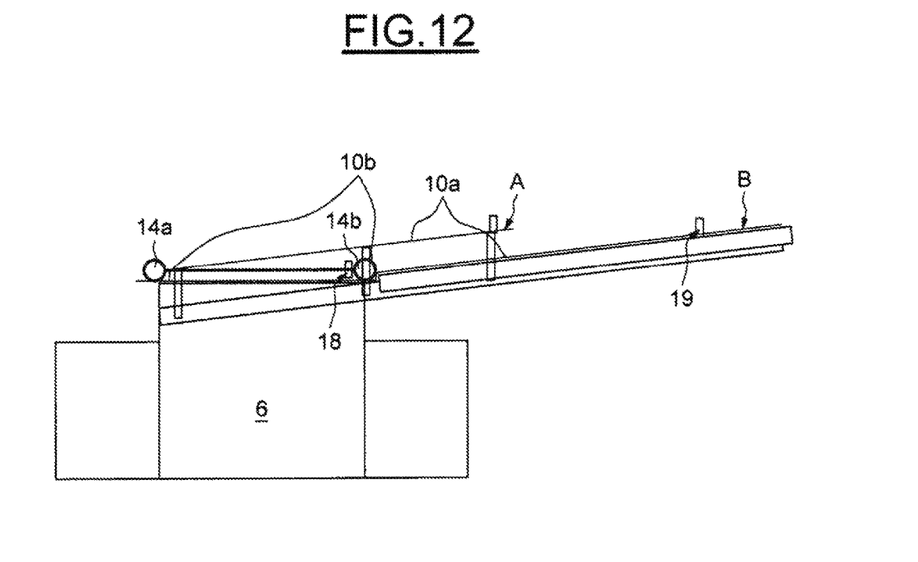
FIG. 12 illustrates the main phases of a control process of a special execution mode of an exhaust system as may be described herein.

To position a duct on the first section, the duct may be placed in a vertical position against a thrust bearing 17 with a lifting means such that the first roller 14a lays on the first rail A (FIG. 9). The thrust bearing may be positioned to ensure a pivot. The duct may be inclined in a manner such that the second roller 14b lays on the other rail B (FIG. 10). With the help of the winch and under the effect of gravity, the rollers 14a and 14b may be shifted along the respective linear portions 10a of rails A and B (FIG. 11) until the rollers reach the end ramps 10b. The duct then may be guided along the ramps until it comes to rest on the first section and a thrust bearing 18 (FIG. 12). The thrust bearing 18 may be positioned about a lower end to ensure a security position. On the other hand, positioning a thrust bearing 19 about the upper end also may provide a security position for one of the detachable ducts 8 or 9.

Figure 13:
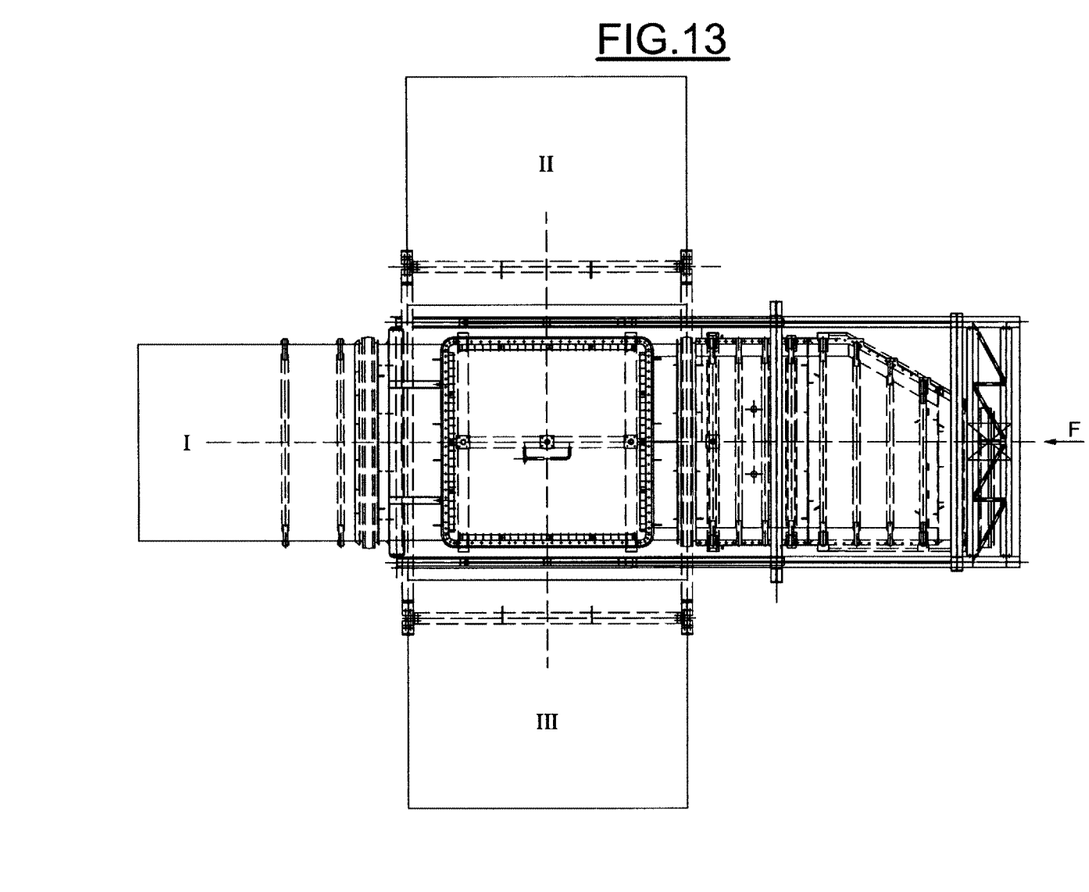
FIG. 13 illustrates an aspect of construction of an exhaust system as may be described herein.

Finally, it will be noted that the invention is not limited to the execution modes described earlier in reference in FIGS. 1-12. In fact, the exhaust system may include a system of rails 10 substantially without a slope while preserving the specific parts 10a and 10b. Furthermore, as shown in FIG. 13 that illustrates three possible positions I, II and III for the second outlet section, the system of rails as well as its kinematics may be implemented on either side of the duct in the exhaust duct, thanks to the symmetry of the system and its assemblies.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. An exhaust system for a gas turbine, comprising:
a bypass duct for exhaust gas of the gas turbine;
the bypass duct comprising a gas inlet section capable of receiving the exhaust gas, a first section for connection with an exhaust gas collector, and a second section for connection with a heat collection boiler;
a first duct positioned about the first section and a second duct positioned about the second section so as to operate the exhaust system in a simple cycle mode or in a combined cycle mode, the first duct having a first duct front end opposite a first duct rear end and the second duct having a second duct front end opposite a second duct rear end;
a plurality of guide rails for guiding the first and second ducts, the plurality of guide rails comprising a top pair of guide rails extending in parallel and above a portion of a bottom pair of guide rails; and
a winch used to control the movement of the first and second ducts along the plurality of guide rails, the winch connected to an end of the bottom pair of guide rails, the end distal from the first section;
wherein the plurality of guide rails extend on both sides of the first section; and
wherein the first duct front end or the second duct front end moves along the top pair of guide rails while the first duct rear end or the second duct rear end moves along the bottom pair of guide rails when the first duct or the second duct are maneuvered into or out of position about the first section.

2. The gas turbine exhaust system according to claim 1, wherein the plurality of guide rails comprises a rectilinear guide and a ramp.

3. The gas turbine exhaust system according to claim 2, wherein the rectilinear guide and the ramp receive a lateral roller therein.

4. The gas turbine exhaust system according to claim 2, wherein the rectilinear guide comprises a slope towards the first section.

5. The gas turbine exhaust system according to claim 1, wherein each one of the first and second ducts comprises a lifting lug for connecting to the winch.

6. The gas turbine exhaust system according to claim 1, wherein a set of sealing joints and/or additional ducts are positioned against at least one of the first and second ducts.

* * * * *